(12) United States Patent
Rijken et al.

(10) Patent No.: US 9,160,909 B2
(45) Date of Patent: Oct. 13, 2015

(54) BACK FOCUS ADJUSTING MODULE AND CAMERA WITH THE BACK FOCUS ADJUSTING MODULE

(75) Inventors: Antonius Maria Rijken, Nuenen (NL); Bastiaan Rothengatter, Rotterdam (NL)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 14/235,930

(22) PCT Filed: Jul. 29, 2011

(86) PCT No.: PCT/EP2011/063157
§ 371 (c)(1),
(2), (4) Date: Jun. 2, 2014

(87) PCT Pub. No.: WO2013/017151
PCT Pub. Date: Feb. 7, 2013

(65) Prior Publication Data
US 2014/0267892 A1    Sep. 18, 2014

(51) Int. Cl.
| H04N 5/225 | (2006.01) |
| G03B 3/04 | (2006.01) |
| G03B 17/14 | (2006.01) |
| G08B 13/196 | (2006.01) |
| H04N 5/232 | (2006.01) |

(52) U.S. Cl.
CPC ............... *H04N 5/2252* (2013.01); *G03B 3/04* (2013.01); *G03B 17/14* (2013.01); *G08B 13/19626* (2013.01); *H04N 5/23212* (2013.01)

(58) Field of Classification Search
CPC ............. H04N 5/2252; H04N 5/23212; G08B 13/19626; G03B 3/04; G03B 17/14
See application file for complete search history.

(56) References Cited

U.S. PATENT DOCUMENTS

| 5,557,327 A | 9/1996 | Hasegawa et al. |
| 2003/0067544 A1 | 4/2003 | Wada |
| 2007/0133972 A1 | 6/2007 | Lee et al. |
| 2008/0074765 A1 | 3/2008 | Hayakawa |
| 2009/0303379 A1 | 12/2009 | Wada et al. |
| 2012/0154663 A1* | 6/2012 | Park et al. ............... 348/333.06 |

FOREIGN PATENT DOCUMENTS

| DE | 102007001649 | 7/2008 |
| EP | 1795934 | 6/2007 |

OTHER PUBLICATIONS

International Search Report for Application No. PCT/EP2011/063157 dated Oct. 11, 2011 (3 pages).

* cited by examiner

*Primary Examiner* — Twyler Haskins
*Assistant Examiner* — Padma Haliyur
(74) *Attorney, Agent, or Firm* — Michael Best & Friedrich LLP

(57) ABSTRACT

The invention concerns a Back focus adjusting module (3) for a camera comprising a supporting structure (6), a linear actuator (11) with a motor (10), a gear mechanism (8) and a component carrier (7), whereby the gear mechanism (8) converts a rotational movement of the motor (10) into a linear motion and displaces the component carrier in a linear direction (9), a spring component (2) for biasing the component carrier (7) in a direction opposite to the linear direction (9), a slider (30) with at least one optical filter (31a, b), whereby the slider (30) can be (1) slid in a guiding slot (32) of the back focus adjusting module (3) between at least two sliding positions in a sliding direction (33), whereby the spring component (2) provides a guiding surface (34a, b, c) of the guiding slot (32) for the slider (30).

18 Claims, 6 Drawing Sheets

BACK FOCUS ADJUSTING MODULE AND CAMERA WITH THE BACK FOCUS ADJUSTING MODULE

STATE OF THE ART

Figure 1:
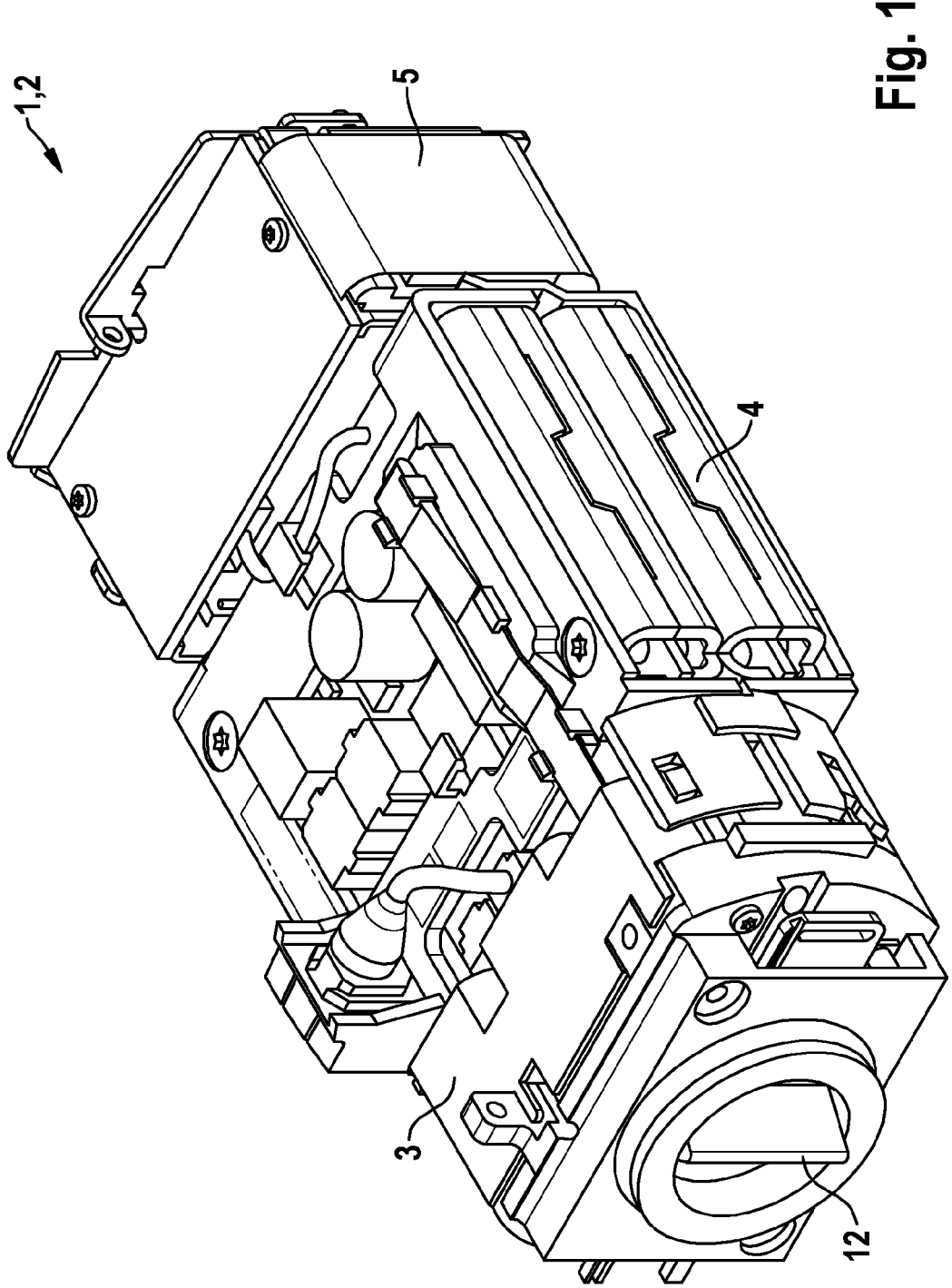

The invention relates to a back focus adjusting module and a camera with the back focus adjusting module. More specifically the invention relates to a back focus adjusting module comprising a supporting structure, a linear actuator with a motor, a gear mechanism and a component carrier, whereby the gear mechanism converts a rotational movement of the motor into a linear motion and displaces the component carrier in a linear direction, a spring component for biasing the component carrier in an direction opposite to the linear direction, and a slider with at least one optical filter, whereby the slider can be slid in a guiding slot of the back focus adjusting module between at least two sliding positions in a sliding direction as well as to the camera with that back focus adjusting module.

Surveillance systems usually comprise a plurality of surveillance cameras and a surveillance control center, which are connected over a private or public network to exchange images, video streams or metadata with each other or with the surveillance control center. Such surveillance cameras should be small, robust, trouble-free and low-maintenance.

A respective camera system or surveillance network is for example disclosed in the document DE 10 2007 001 649 A1.

DISCLOSURE OF THE INVENTION

The invention relates to a back focus adjusting module with the features of claim 1 and to a camera with the features of claim 10. Preferred or advantageous embodiments of the invention are disclosed by the dependent claims, the description and the figures.

The subject-matter of the invention is a back focus adjusting module, which is adapted to adjust the distance between an image capturing unit, for example a CCD- or CMOS-chip, and an object lens of the camera. Such back focus adjustment is useful to increase the sharpness and/or contrast of images projected on the image capturing unit by the object lens. According to the invention the image capturing unit is moved in a linear direction in the back focus adjusting module to adapt the distance. Preferably, the linear direction is parallel or identical to the viewing direction of the camera and/or the optical axis of the object lens and/or perpendicular to the surface extension of an image sensor in the image capturing device.

The back focus adjusting module comprises a supporting structure, which is for example made of plastic and may be molded, especially injection molded. The supporting structure defines a basis for other parts of the back focus adjusting module. Preferably, the supporting structure is arranged stationary or fixed in or on the camera and is realized as a housing.

Attached to the supporting structure is a linear actuator with a component carrier for carrying the image capturing unit as the component. Optionally, the image capturing unit is part of the back focus adjusting module. In general, the component carrier may comprise a plurality of separate parts. In order to facilitate the assembly of the linear actuator, it is preferred that the component carrier is formed integrally or as one-piece, for example as a molded, especially injection molded part made of plastic. The linear actuator further comprises a motor and a gear mechanism, whereby the gear mechanism converts a rotational movement of the motor into a linear motion and displaces the component carrier and thus the image capturing unit in the linear direction to adjust the distance between the image capturing unit and the object lens.

The linear actuator is adapted to displace and/or press the component carrier in the linear direction especially towards the object lens. For retracting the component carrier in the opposite direction and/or for holding the component carrier in a pre-loaded contact with the gear mechanism, a spring component is provided, which biases the component carrier in said opposite direction. Especially, the spring component is adapted to press the component carrier in said opposite direction.

The back focus adjusting module further comprises a slider with at least one optical filter. In a possible embodiment of the invention, the slider holds two filters, a IR-filter (infrared) and a dummy-filter, for example a glass plate. In operation the IR-filter is used at night and the dummy-filter during the day. By using the dummy-filter the optical paths during night and day operation are equal. Further filters may be mounted on the slider. The slider is preferably driven by a sliding motor. In order to place the optical filter or filters in position, the slider can be slid in a guiding slot of the back focus adjusting module between at least two sliding positions. The guiding slot crosses the optical path between the object lens and the image capturing unit, so that the filter(s) can be placed in the optical path.

According to the invention, the spring component provides a guiding surface of the guiding slot for the slider. Thus the slider contacts the guiding surface of the spring component during sliding and/or in the sliding positions.

It is one finding of the invention that the spring component can be used as a multifunctional component in the back focus adjusting module in order to reduce the number of parts and to facilitate the assembly of the back focus adjusting module. By reduction of the number of parts, also the robustness of the camera is improved, because fewer parts reduce the probability that parts fall out from their position. Furthermore it is possible to save or to reduce the required space, because although the spring component provides a plurality of functions, it only needs a single mechanical interface to be fixed in the module.

In a preferred embodiment of the invention, the guiding slot is formed together by the supporting structure and by the spring component. In this embodiment parts of guiding surfaces are provided by the supporting structure, especially the housing, and other parts of the guiding surfaces are provided by the spring component. It is often difficult and complex to design a housing with an integrally formed guiding slot, as the housing must be kept detachable from the molding tool. In the preferred embodiment, parts of the guiding slot are supplied by the spring component, so that the complexity of the design of the supporting structure, especially of the housing, is kept low.

In a possible realization of the invention, the spring component comprises a side guiding surface, a top guiding surface and/or a bottom guiding surface of the guiding slot. It is especially preferred that the spring component provides all three surfaces, so that it forms a bracket for the slider or encompasses the slider in part. The top and/or bottom guiding surfaces represent support surfaces for the slider. In this realization, the bigger part of the guiding surfaces is provided by the spring component, so that the integration of the remaining guiding surfaces into the supporting structure is simple.

In order to put the biasing function of the spring components into practice it is possible that the spring component comprises at least one, preferably two or more leaf spring sections, which bias the component carrier. Preferably, at least one leaf spring section is embodied as a leg or as a tongue with a free end, whereby the free end abut on the component carrier. This embodiment allows constant or nearly constant biasing forces over the possible overall travel distance of the component carrier.

In a further development of the invention the spring component comprises at least one flatform spring or formed leaf spring acting as a positive-locking partner for locking the spring component in the support structure. In this development, the spring component realizes a further function, which is a self-locking function in the support structure, so that further fixing devices like screws can be omitted or are omitted. This development allows an easy and quick assembly of the back focus adjusting module. Furthermore, the spring component is flexibly held and thus shock proofed arranged in the support structure.

In a possible practical realization, the flatform spring is a bended finger, which is locked in a undercut of the support structure, especially to prevent a accidentally releasing of the spring component in the opposite direction.

In yet a further embodiment of the invention, the spring component comprises a positioning section and the support structure comprises a positioning recess for accommodating the positioning section. and for holding the spring component in a positive-locking manner with respect to a plane perpendicular to the linear direction. With the help of the positioning section, the spring component can be easily fixed in its position with a low tolerance.

It is especially preferred that the spring component is a single-piece or one-piece-part. Consequently, all functional sections are tightly fixed to each other. In a preferred realization, the spring component is a metal sheet part, made by cutting and bending a metal sheet. In this realization, the spring component can be manufactured with a high precision, low tolerances and at low production costs.

A further subject-matter of the invention is a camera, especially a surveillance camera with a back focus adjusting module as described above for adjusting the position of the image capturing unit of the camera. The camera may further comprise an interface module for communicating inside a surveillance network or with a surveillance center to transfer data, especially images or video streams or other metadata to the surveillance center or to receive messages or instructions from the surveillance center.

Figure 2:
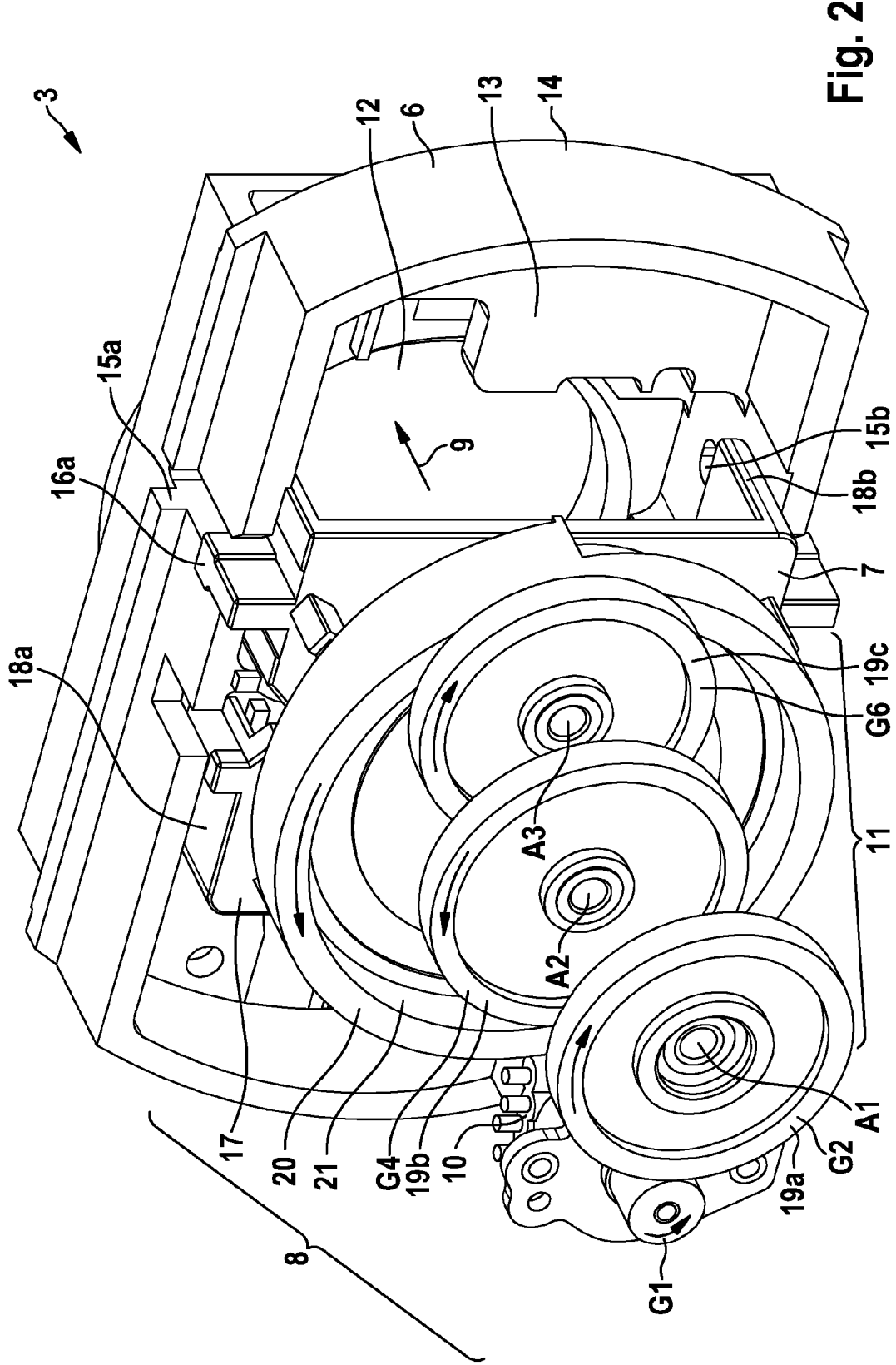
Figure 3:
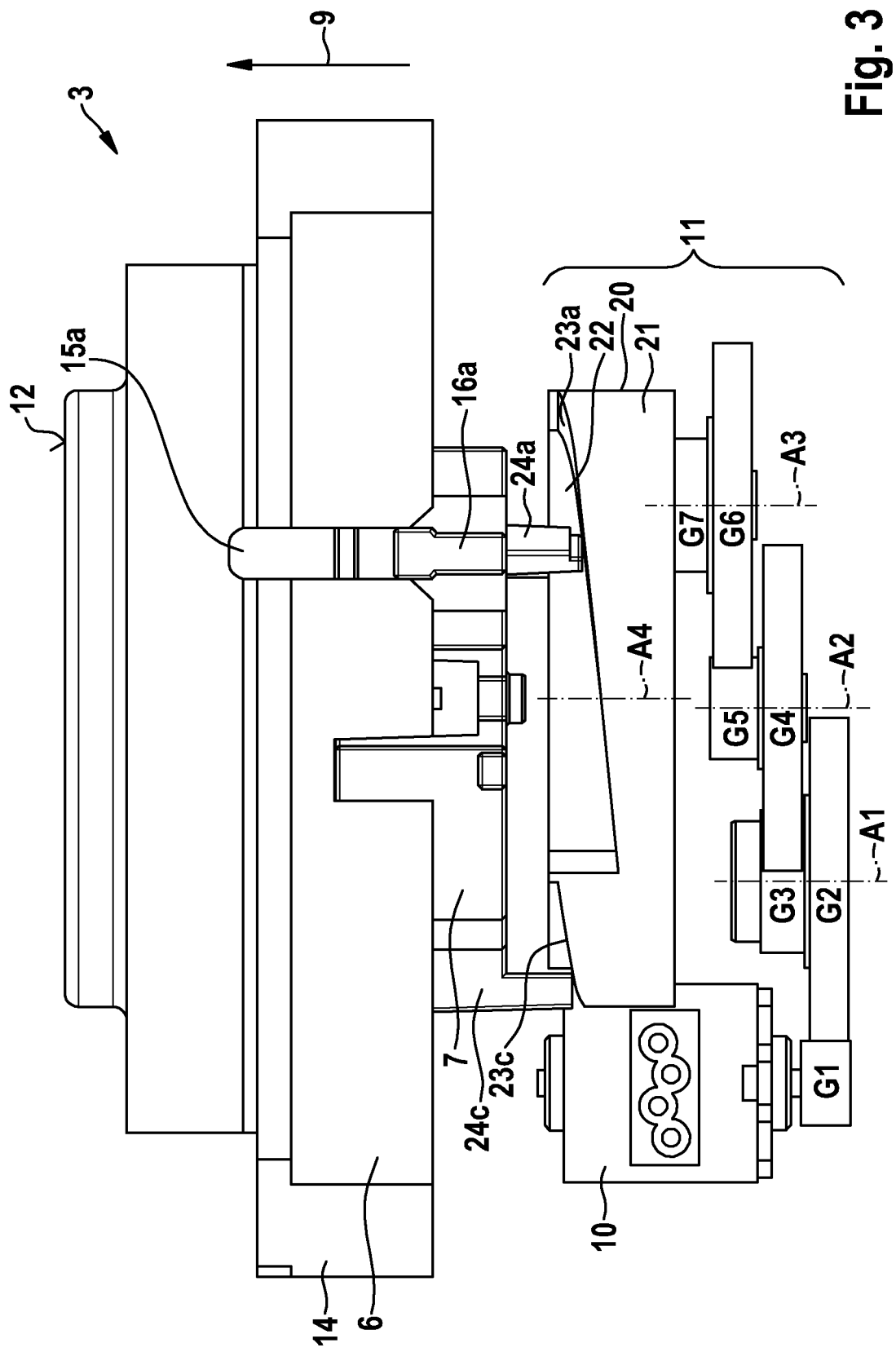
Figure 4:
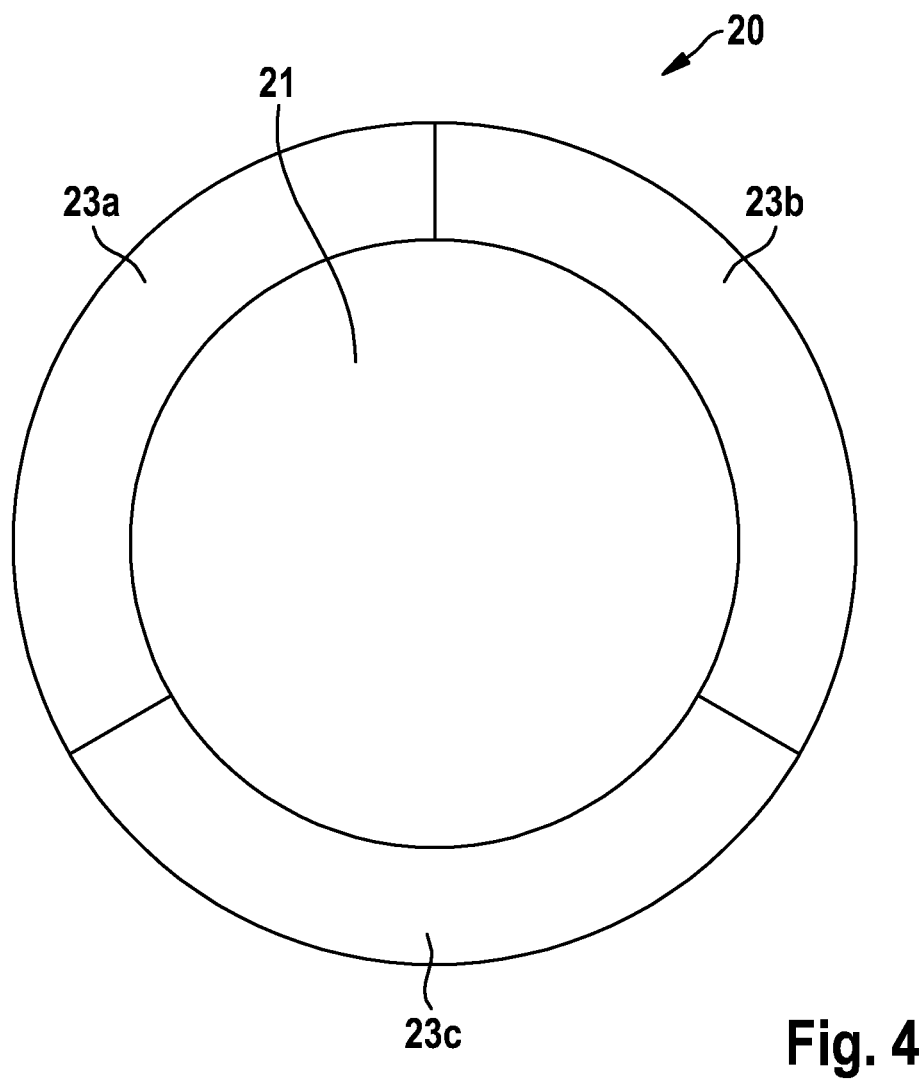
Figure 5:
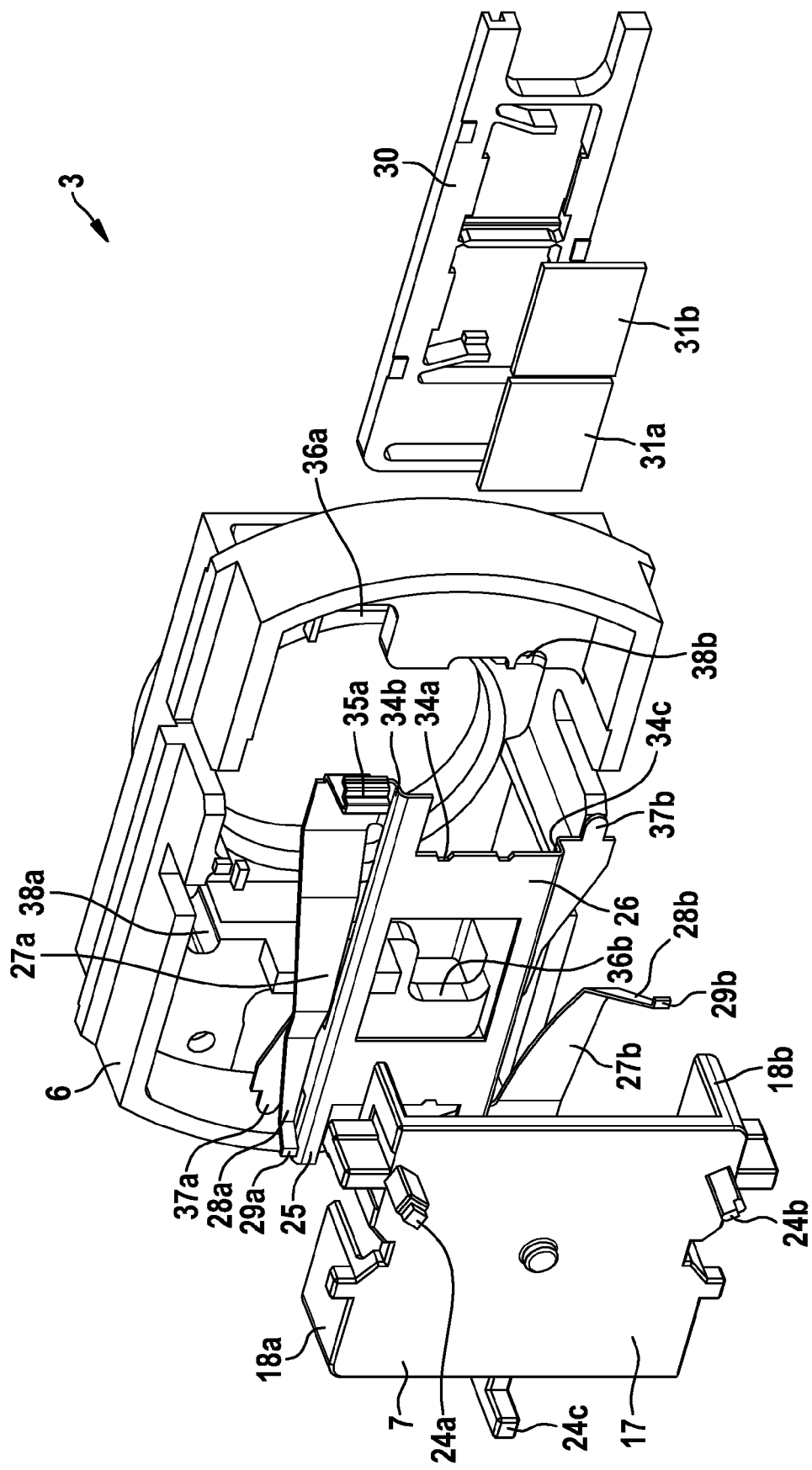

Further features, advantages and effects of the invention will become apparent by the description of a preferred embodiment of the invention and the figures as attached. The figures show:

FIG. 1 an isometric view from the bottom side on an unit of a camera as an embodiment of the invention;

FIG. 2 an isometric view from the rear side into the back focus adjusting module of the camera in FIG. 1;

FIG. 3 a bottom view onto the back focus adjusting module in FIG. 2;

FIG. 4 a schematic front view on the transfer gear of the back focus adjusting module in the FIGS. 3 and 4;

FIG. 5 an isometric, exploded view of parts of the back focus adjusting

Figure 6:
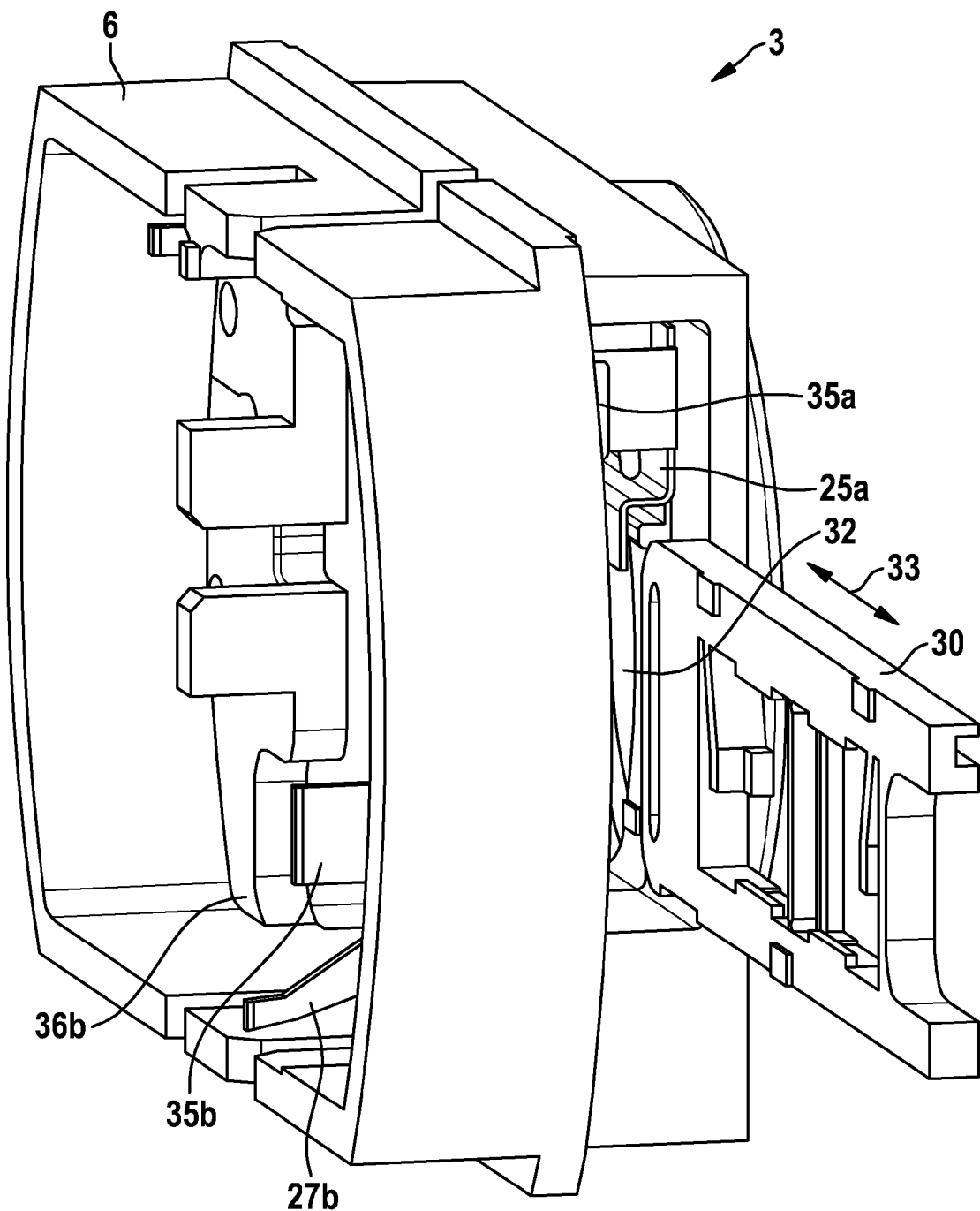

FIG. 6 a isometric view of parts of the back focus adjusting module from the previous figures.

FIG. 1 represents a three-dimensional view of a camera 1 as an embodiment of the invention without an external housing and without object lens, so that only a unit 2 of the camera 1 is shown. The camera 1 and thus the unit 2 is a surveillance camera, for example used in a surveillance network.

The unit 2 may roughly be divided into three sub-assemblies, namely a motorized back focus adjusting module 3 for adjusting the back focus of the camera 1, an image processing module 4 including a power stack and an interface module 5.

The motorized back focus adjusting module 3 is box-shaped and has the function to adjust the back focus of the camera 1 by changing the distance between the object lens (not shown) and the image capturing unit (not shown) as discussed later. In the image processing module 4, the images captured by the image capturing unit are pre-processed, processed, compressed etc. It is also possible that the images are analyzed or object detection or object tracking is performed. The images may be realized as single images, series of images or video streams with a plurality of images. The image processing unit 4 comprises one or two printed circuit boards. The power pack provides the power for the camera 1 by converting or processing a supply voltage.

The interface module 5 provides a plurality of electric/electronic interfaces for example for the power supply for providing the supply voltage, a network interface for example for communicating with a surveillance control center and for transferring images or metadata of the images to the surveillance control center.

FIG. 2 illustrates the motorized back focus adjusting module 3 in a three-dimensional view from the backside, whereby some components are suppressed in the drawing. FIG. 3 illustrates the same by a top view. The motorized back focus adjusting module 3 comprises a housing 6 as a supporting structure in which a component carrier 7 as a part of a linear actuator 8 is arranged movably in a linear direction 9. The linear actuator 8 further comprises a motor 10 and a gear mechanism 11, which is adapted to convert the rotational movement of the motor 10 into the displacement of the component carrier 7 in linear direction 9.

On the component carrier 7 an image capturing unit (not shown), for example a CMOS- or CCD-chip is arranged. The housing 6 comprises a front opening 12, whereby the object lenses (not shown), the front opening 12 and the image capturing unit are aligned, so that an image is transferred by the object lens, through the front opening 12 to the image capturing device. The optical axis of the object lens is parallel or identical to the linear direction 9, so that by moving or displacing the component carrier 7 in the linear direction 9 the distance along the optical axis between the object lens and the image capturing unit is changed for the same amount and thus allows to adjust the back focus of the camera 1.

The housing 6 is made of metal, but could also be made from plastic and is for example a die casted part. It comprises a front wall 13 and circumferential side walls 14, which form an interior space in which the component carrier 7 is partly accommodated. The housing 6 shows a plurality of recesses or sections being integrally formed in the housing 6, which will be explained in the following step by step. The housing 6 comprises two guiding slots 15 *a, b* extending in the linear direction 9 which guide two rips 16 *a, b* integrally formed on the component carrier 7 so that the component carrier 7 is positively-locked and so that it can only be moved in the linear direction 9. The metal is used for reasons of heat-transfer function The component carrier 7 is also made of metal, but could also be made from plastic, especially die-casted and comprises a back-wall as main section 17 from which a bottom wall 18 *a* and a top wall 18*b* extends in the linear direction perpendicular to the main section 17 on which the rips 16 *a, b* are formed, respectively. The metal is used for reasons of heat-transfer function The motor 10 is arranged on the housing 6 and transfers its rotational movement in the gear mechanism 11. The motor 10 is a step-motor with for example a full step-width of 18°. The output shaft of the motor 10 is coupled with a first gear G1.

The gear G1 is coupled with a first gear unit 19a comprising a gear G2 and a gear G3, which are rigidly coupled and have the same rotation axis A1. The external surface of the gear G1 is coupled with the external surface of the gear G2. The diameter of the gear G2 is larger than the diameter of the gear G3.

The gear G3 is coupled with a second gear unit 19b comprising a gear G4 and a gear G5, which are rigidly coupled and have the same rotation axis A2. The diameter of the gear G4 is larger than the diameter of the gear G5. The external surface of the gear G3 is coupled with the external surface of the gear G4.

The gear G5 is coupled with a third gear unit 19c comprising a gear G6 and a gear G7, which are rigidly coupled and have the same rotation axis A3. The diameter of the gear G6 is larger than the diameter of the gear G7. The external surface of the gear G5 is coupled with the external surface of the gear G6.

The gear G7 is coupled with a transfer gear 20 comprising a gear section 21 on the side facing the gears G1 . . . G7 and a guide section 22 facing the component carrier 7. The gear section 21 comprises an internal surface with a hollow gear section which is coupled with the gear G7. The transfer gear 20 rotates around a rotation axis A4.

All axis A1, A2, A3, A4 are parallel to each other and are parallel to the linear direction 9 and the optical axis. The gears G1 . . . G7 and the transfer gear 20 are spur gears and may be coupled with each other by friction or by teeth. Based on the diameters of the gears G1 . . . G7 and the transfer gear 20, the number of revolutions per minute at the motor 10 side is larger than the number of revolutions per minute at the transfer gear 20 side. The transfer gear 20 can be rotated, oscillated or swiveled by the motor 10 and the gear mechanism 8.

As it can be best seen by FIG. 4, which is a schematic front view on the guide section 21 of the transfer gear 20, three guide ways 23a, b, c are formed in the transfer gear 20, whereby each guide way 23a, b, c extends in a circumferential or rotational direction. Each guide way 23a, b, c extends over an angle range of nearly 120°. The height of the transfer wheel 20—also called wedge wheel—is 7 mm.

As it can be seen in FIG. 3, the guide ways 23a, b, c are sloped in the direction of their extension. The height difference from the beginning to the end of the slope in linear direction 9 is 3 mm. All three guide ways 23a, b, c have the same constant slope. The component carrier 7 comprises three resting blocks 24a, b, c being integrally formed in the component carrier 7 and extend in opposite direction to the linear direction 9 as a resting or opposite direction, whereby each guide way 23a, b, c supports one of the resting blocks 24a, b, c.

The resting blocks 24a, b, c as resting means abut upon the guide ways 23a, b, c in the resting or opposite direction. In case the transfer gear 20 is rotated around its rotation axis A4, the resting blocks 24a, b, c slide relative to the guide ways 23a, b, c and are displaced by the slopes in the linear direction 9. As a result, the component carrier 7 is moved in the linear direction 9.

In this embodiment based on the design of the motor 10, the gear mechanism 8, the slopes of the transfer gear 20, the linear actuator 11 allows a total displacement of the component carrier 7 of 3 mm, whereby each step of 18° of the motor 10 results in a step of the component carrier 7 in linear direction 9 of 3 μm (micrometers). The combined height of the linear actuator 11 is only about 15 mm.

Between the component carrier 7 and the housing 6 a spring component 25 is arranged, which is only shown in the FIGS. 5 and 6, which illustrate an exploded isometric and a non-exploded isometric view of the housing 6 with the spring component 25. The spring component 25 is a multifunctional part and comprises a guiding section 26 and spring sections 27a, b arranged on the upper and lower side of the guiding 26.

A first function of the spring component 25 is a biasing function. The linear actuator 11 is only capable to press the component carrier in the linear direction 9, but is not capable to retract the component carrier 7 in the opposite direction. The spring component 25 pre-loads the component carrier 7 in the opposite or resting direction, so in case the linear actuator 11 retracts, the component carrier 7 is actively pressed in the opposite direction. Furthermore, the spring component 25 secures that the component carrier 7 is always in contact with the transfer wheel 20 and holds the component carrier 7 at its position. Each spring section 27a, b comprises a leaf spring section 28a, b, which is for example leg- or tongue-shaped and which extends parallel to the guiding section 26 and is formed or angled in a direction towards the component carrier 7. The leaf spring sections 28a, b, press with their free ends, 29a, b against the component carrier 7, so that the component carrier 7 is preloaded in said opposite direction.

The back focus adjusting module 3 comprises a slider 30, which is a holder or a track for two optical filters 31a, b. The slider 30 can be inserted in a guiding slot 32 of the back focus adjusting module 3 in a sliding direction 33, which is perpendicular to the linear direction 9. The slider 30 can be arranged in two sliding positions, whereby in a first sliding position, the first optical filter 31a, for example an IR-filter, and in a second sliding position the second optical filter 31 b, for example a dummy filter, is placed in the optical path between the object lens and the image capturing unit. The slider 30 is driven by a further motor, which is not shown in the figures.

A second function of the spring component 25 is to provide guiding surfaces for the slider 30 to support or to realize a form-locking guidance of the slider 30 in the sliding direction 33. The guiding section 26 comprises a side guiding surface 34a, a bottom guiding surface 34b and a top guiding surface 34c, which all three face the slider 30 in the sliding slot 32. The side guiding surface 34a extends parallel to the slider 30 and the sliding direction 33 and is perpendicular to the linear direction 9. The bottom and top guiding surfaces 34b, c are arranged on wing sections which extend perpendicular to the side guiding surface 34a and are bridging the guiding section 26 and spring sections 27a, b. Summarized, in a cross-section perpendicular to the sliding direction 33, the guiding section 26 provides a u-formed guiding for the slider 30. In the remaining or open area, the slider 30 is guided by a guiding surface of the housing 6, so that the guiding slot 32 is formed together by the spring component 2 and the housing 6.

A third function of the spring component 25 is a locking function, whereby the spring component 25 is locked in the housing 6. Each leaf section 27a, b comprises a flatform spring 35a, b (or bended leaf spring), which is resilient or flexible in the linear direction 9. The flatform springs 35a, b are designed to fit into undercuts 36a, b provided as recesses in the housing 6. During assembly of the back focus adjusting module 3, the spring component 25 is inserted into the housing 6 along the linear direction 9. In the final position, the flatform springs 35a, b realized as bended fingers snap or are positioned in the undercuts 36a, b. After releasing the spring component 25, the flatform springs 35a, b are form-locking members preventing a loosing of the spring component 25 in said opposite direction.

A fourth function of the spring component 25 is a positioning function, whereby the spring component 25 is realized as a self-centering or self-positioning part. Each leaf section 27a, b comprises a positioning section 37a, b, which are accommodated by positioning recesses 38a, b integrally formed in the housing 6.

The positioning recesses 38 a, b are grooves, which extend in the linear direction 9. The positioning sections 37a, b and the positioning recesses 38a, b act as assembly aid, as the spring component 25 is guided to its final position, and as a form-locking mounting in the final position of the spring component 25.

The spring component 25 is made of metal and is realized as a one-piece metal sheet part and may be manufactured by cutting and bending of a metal sheet.

The invention claimed is:

1. A back focus adjusting module (3) for a camera (1) comprising
    a supporting structure (6),
    a linear actuator (11) with a motor (10), a gear mechanism (8) and a component carrier (7),
    whereby the gear mechanism (8) converts a rotational movement of the motor (10) into a linear motion and displaces the component carrier (3) in a linear direction (9),
    a spring component (25) for biasing the component carrier (7) in a direction opposite to the linear direction (9),
    a slider (30) with at least one optical filter (31 a, b), whereby the slider (30) is slidable in a guiding slot (32) of the back focus adjusting module (3) between at least two sliding positions in a sliding direction (33),
    characterized in
    that the spring component (25) provides a guiding surface (34a, b, c) of the guiding slot (32) for the slider (30).

2. The back focus adjusting module (3) according to claim 1, characterized in that the guiding slot (23) is formed together by the spring component (25) and the supporting structure (6).

3. The back focus adjusting module (3) according to claim 1, characterized in that the spring component (25) provides at least one of a side guiding surface (34a), a top guiding surface (34c) and a bottom guiding surface (34b) of the guiding slot (32).

4. The back focus adjustment module (3) according to claim 1, characterized in that the spring component (25) provides at least one leaf spring section (28 a, b) for biasing the component carrier (7).

5. The back focus adjusting module (3) according to claim 1, characterized in that the spring component (25) provides at least one flatform spring (35 a, b) for locking the spring component (25) in the support structure (6).

6. The back focus adjusting module (3) according to claim 5, characterized in that the flatform spring (35 a, b) is a bended finger.

7. The back focus adjusting module (3) according to claim 1, characterized in that the spring component (25) provides a positioning section (37 a, b) and the support structure (6) provides a recess (38 a, b) for accommodating the positioning section (37 a, b), so that the spring component (25) is held in a form-locking manner.

8. The back focus adjusting module (3) according to claim 1, characterized in that the spring component (25) is a single-piece or one-piece part.

9. The back focus adjusting module (3) according to claim 1, characterized in that the spring component (25) is a sheet metal part.

10. A camera (1) with a back focus module (3) according to claim 1.

11. The camera according to claim 10, characterized in that the guiding slot (23) is formed together by the spring component (25) and the supporting structure (6).

12. The camera according to claim 10, characterized in that the spring component (25) provides at least one of a side guiding surface (34a), a top guiding surface (34c) and a bottom guiding surface (34b) of the guiding slot (32).

13. The camera according to claim 10, characterized in that the spring component (25) provides at least one leaf spring section (28 a, b) for biasing the component carrier (7).

14. The camera according to claim 10, characterized in that the spring component (25) provides at least one flatform spring (35 a, b) for locking the spring component (25) in the support structure (6).

15. The camera according to claim 14, characterized in that the flatform spring (35 a, b) is a bended finger.

16. The camera according to claim 10, characterized in that the spring component (25) provides a positioning section (37 a, b) and the support structure (6) provides a recess (38 a, b) for accommodating the positioning section (37 a, b), so that the spring component (25) is held in a form-locking manner.

17. The camera according to claim 10, characterized in that the spring component (25) is a single-piece or one-piece part.

18. The camera according to claim 10, characterized in that the spring component (25) is a sheet metal part.

* * * * *